United States Patent [19]

Krause et al.

[11] 4,118,335
[45] Oct. 3, 1978

[54] LIQUID CRYSTALLINE MATERIALS OF REDUCED VISCOSITY

[75] Inventors: Joachim Krause; Ralf Streinsträsser; Ludwig Pohl; Fernando Del Pino; Georg Weber, all of Darmstadt, Germany

[73] Assignee: Merck Patent Gesellschaft mit beschrankter Haftung, Germany

[21] Appl. No.: 730,953

[22] Filed: Oct. 8, 1976

[30] Foreign Application Priority Data

Oct. 29, 1975 [DE] Fed. Rep. of Germany ....... 2548360

[51] Int. Cl.$^2$ .......................... G09K 3/34; C02F 1/13
[52] U.S. Cl. ...................................... 252/299; 252/63; 350/150; 350/350
[58] Field of Search ...................... 252/299, 408, 63; 350/160 LC, 150

[56] References Cited

U.S. PATENT DOCUMENTS

| | | | |
|---|---|---|---|
| 3,826,757 | 7/1974 | Wong | 252/299 |
| 3,925,238 | 12/1975 | Gavrilovic | 252/299 |
| 3,947,375 | 3/1976 | Gray et al. | 252/299 |
| 3,951,846 | 4/1976 | Gavrilovic | 252/299 |
| 3,983,049 | 9/1976 | Aftergut et al. | 252/299 |
| 4,000,084 | 12/1976 | Hsieh et al. | 252/299 |
| 4,011,173 | 3/1977 | Steinstrasser | 252/299 |
| 4,017,416 | 4/1977 | Inukai et al. | 252/299 |
| 4,065,489 | 12/1977 | Steinstrasser et al. | 252/299 |

FOREIGN PATENT DOCUMENTS 2,502,904  7/1975  Fed. Rep. of Germany ........... 252/299
2,365,226  7/1974  Fed. Rep. of Germany ........... 252/299

Primary Examiner—Benjamin R. Padgett
Assistant Examiner—T. S. Gron
Attorney, Agent, or Firm—Millen & White

[57] ABSTRACT

Biphenyl derivatives of the formula

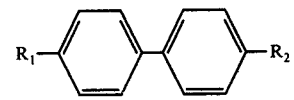

wherein $R_1$ and $R_2$ are the same or different and are straight-chain alkyl of 2 – 12 carbon atoms and collectively have at least 5 carbon atoms, are added to known liquid crystalline materials to significantly lower the viscosity thereof.

14 Claims, No Drawings

LIQUID CRYSTALLINE MATERIALS OF REDUCED VISCOSITY

BACKGROUND OF THE INVENTION

This invention relates to dielectrics for electronic components based on mixtures of known liquid crystalline compounds, the viscosity of which is favorably affected by inclusion therein of certain biphenyl compounds.

Nematic or nematic-cholesteric liquid crystalline materials, which undergo significant changes in optical properties, such as light scattering, birefringence, reflecting power or color, under the influence of electric fields, are being used, to an increasing extent, as electro-optical indicator elements. The operation of such indicator elements depends, for example, on dynamic scattering, deformation of aligned phases or the Schadt-Helfrich effect in the twisted cell.

Liquid crystalline materials for commercial application in electronic indicator components, e.g., liquid crystal display elements, must satisfy a plurality of requirements. Especially important are:

(a) chemical stability to moisture, air and physical influences, such as heat, infrared, visible and ultraviolet radiation and direct and alternating electrical fields;

(b) a liquid crystalline mesophase in the temperature range of $+10°$ C. to $+50°$ C., preferably from $0°$ C. to $60°$ C.;

(c) low viscosity at room temperature, preferably not above 70 cP; and (d) no inherent absorption of visible light, that is, the compounds must be colorless.

Numerous liquid crystalline substances satisfy the stability requirements for dielectrics in electronic constructional elements and are also colorless or have inherent color, which is substantially suppressed by suitable additives. See published German Patent Specification No. 2,209,127. p,p'-Disubstituted azoxybenzenes described in German Patent Specification No. 2,014,989 (U.S. Pat. No. 3,773,747), p,p'-disubstituted benzoic acid phenyl esters described in published German Patent Specification No. 2,139,628 (Ser. No. 277,502, filed Aug. 3, 1972), and p,p'-disubstituted biphenyl derivatives described in published German Patent Specification No. 2,356,085, are typical types of compounds, all of whose disclosures are incorporated by reference.

In these and other known series of compounds having a liquid crystalline mesophase, there are no individual compounds which form a liquid crystalline nematic mesophase in the required temperature range of $10°$ C. to $50°$ C. It is therefore conventional to prepare mixtures of two or more compounds to obtain materials usable as liquid crystalline dielectrics. Usually, a compound with a low melting and clear point is mixed with another having a markedly higher melting and clear point. Usually, the melting point of the mixture is below that of the lower melting component and the clear point is between the clear points of the components. However, optimum dielectrics cannot be prepared in this manner because the component having the high melting and clear point almost always imparts high viscosity to the mixture, so that switch times of electro-optical indicator elements produced therewith become undesirably long.

It is an object of this invention to provide liquid crystalline dielectrics which exhibit a nematic phase in the required temperature range and have sufficiently short switch times in liquid crystal cells at room temperature.

SUMMARY OF THE INVENTION

In a compositional aspect, this invention relates to a liquid crystalline composition comprising a mixture of (a) at least one liquid crystalline compound and (b) an amount effective to lower the viscosity of (a) of a biphenyl compound of Formula I,

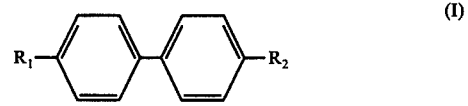

wherein $R_1$ and $R_2$ each are straight-chain alkyl of 2–12 carbon atoms and collectively contain at least 5 carbon atoms.

In an article of manufacture aspect, this invention further relates to liquid crystal displays employing as a dielectric a liquid crystalline composition of this invention.

In a method of use aspect, this invention relates to the method for lowering the viscosity of a liquid crystalline composition comprising adding thereto a viscosity-lowering amount of a biphenyl compound of Formula I.

In a compound aspect, this invention relates to a biphenyl compound of Formula I above, wherein $R_1$ and $R_2$ are different from each other and are straight chain alkyl of 2–12 carbon atoms and collectively contain at least 5 carbon atoms.

DETAILED DESCRIPTION

In compounds of Formula (I), no enantiotropic liquid crystalline phase is observed in the temperature range $-10°$ C. to $+100°$ C. Therefore, compounds of Formula (I) are not dielectrics for electronic indicator elements based on liquid crystal cells as such. Although clear points of liquid crystalline materials are considerably lowered by addition of non-liquid crystalline substances, it is surprising that clear points of known liquid crystalline substances are not undesirably reduced by addition of one or more biphenyl compounds of Formula (I) in amounts sufficient to reduce the viscosity, e.g., to below 100 cP, preferably below 70 cP. If the starting liquid crystalline material already has a viscosity below 70 cP, an amount of at least one compound of Formula I effective to reduce the viscosity thereof at least 10%, preferably at least 20%, is added thereto.

This invention includes liquid crystalline materials, which, in addition to one or more liquid crystalline compound, contain at least one biphenyl of the Formula (I), as well as dielectrics for electronic constructional elements consisting essentially of these liquid crystalline materials. The invention includes use of biphenyl derivatives of Formula (I) to reduce the viscosity of liquid crystalline substances.

The invention further includes a process for preparing liquid crystalline materials of reduced viscosity by incorporating 1–45 parts by weight of at least one biphenyl compound of Formula (I) into known liquid crystalline substances.

In biphenyl compounds of Formula (I), $R_1$ and $R_2$ can be the same or different, provided that collectively they contain at least 5 carbon atoms and that $R_1$ and $R_2$ are straight-chain alkyl of 2–12 carbon atoms, that is, ethyl, n-propyl, n-butyl, n-pentyl, n-hexyl, n-heptyl, n-octyl, n-nonyl, n-decyl, n-undecyl or n-dodecyl.

Preferred additives to liquid crystalline materials of this invention are biphenyl derivatives of Formula (I) wherein $R_2$ is alkyl of 5 to 12 carbon atoms, i.e., of Formula (Ia)

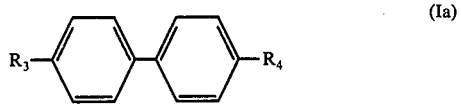

(Ia)

wherein $R_3$ is straight-chain alkyl of 2-12 carbon atoms and $R_4$ a straight-chain alkyl of 5-12 carbon atoms. Especially preferred are biphenyl derivatives of Formula I wherein $R_1$ is alkyl of 2 to 7 carbon atoms and $R_2$ is alkyl of 5 to 10 carbon atoms, i.e., of Formula (Ib)

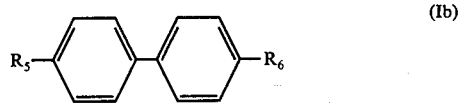

(Ib)

wherein $R_5$ is straight-chain alkyl of 2-7 carbon atoms and $R_6$ is straight-chain alkyl of 5-10 carbon atoms.

The liquid crystalline compositions of the invention contain, per 100 parts thereof, at least 1 and at most 45 parts by weight (weight %) of one or more biphenyl compounds of Formula (I). Preferred compositions contain 10 to 40, most preferably 20 to 35 parts by weight, of at least one biphenyl compound of Formula (I). In these amounts, these biphenyl additives reduce the viscosity of the liquid crystalline base material an average of 20-60%. The switching times of liquid crystal indicator elements produced with the materials of the invention are shortened correspondingly.

Clear points of liquid crystal substances of the invention are admittedly lower than those of liquid crystalline base materials, but by suitable choice of base materials and of the added amount of biphenyl compounds of Formula (I), mixtures are obtained for which the clear points are not reached even owing to heat generated during continuous operation of the indicator elements produced therewith.

Some biphenyl compounds of Formula (I) are known and described in the literature, e.g. 4,4'-di-n-propyl-biphenyl: G. Adda et al., Compt. Rend. Acad. Sci, Paris, Ser. C., Vol. 266 (1968), pp. 35-36; 4,4'-di-n-butylbiphenyl and 4,4'-di-n-octylbiphenyl: E. P. Kaplan et al., Zhur. Obsh. Khim, Vol. 30 (1960), pp. 369-376; 4,4'-di-n-hexylbiphenyl and 4,4'-di-n-heptylbiphenyl: H. Dehne et al., Z.Chem 1969, pp. 342-343. The novel compounds can be prepared in similar manner as those known in the literature.

For example, biphenyl is reacted under usual conditions for a Friedel-Crafts acylation with an approximately equimolar amount of a carboxylic acid halide with a number of carbon atoms corresponding to the alkyl being introduced. The alkylbiphenyl-(4)-yl ketone thereby obtained is reduced to the next higher 4-alkyl-biphenyl. Subsequently, a second alkyl is introduced in the same way at the 4'-position of the thus prepared 4-alkylbiphenyl. Symmetrical 4,4'-dialkylbiphenyls can also be prepared by Friedel-Crafts acylation of biphenyl with about two equivalents of a carboxylic acid halide and subsequent reduction of both keto groups of the intermediate diacylbiphenyl obtained.

Liquid crystalline base materials, the properties of which are improved by addition of biphenyl derivatives of Formula (I), include those already known and used as dielectrics in liquid crystal indicator elements or are suitable for this purpose. Preferred are those having room temperature viscosities above 70 cP, preferably 100 cP or above and, preferably also, those other properties described hereinbefore required for liquid crystalline materials used in liquid crystal display elements. The most common are mixtures of derivatives of azobenzene, azoxybenzene, biphenyl, phenyl benzoate, halogenated stilbene, diphenylacetylene, diphenyl nitrone and substituted cinnamic acids, as well as Schiff bases. Of the latter, benzylidene compounds are preferred. Isomeric pairs and/or eutectic mixtures can be used.

Examples of the above known nematic substances usable in the liquid crystalline composition of this invention include compounds of Formula (II)

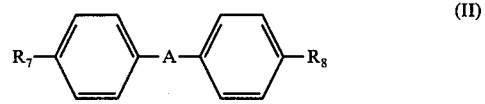

(II)

wherein A is

—CH=CH—,

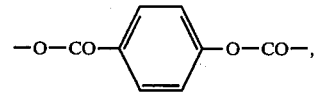

—CX'=CH—,
—CH=CX'—,

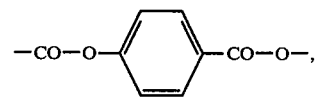

—C≡C—,
—N=N—,
—N(O)=N—,
—N=N(O)—,
—O—CO—,
—CO—O—;

—CH=N—,
—N=CH—,
—CH=N(O)—,
—N(O)=CH—,
or a C—C single bond;

X' is halogen, preferably Cl; and $R_7$ and $R_8$ are the same or different and each are alkyl, alkoxy or alkanoyloxy, preferably straight chain, of up to 18, preferably up to 8 carbon atoms; or one of $R_7$ and $R_8$ is cyano, nitro or isonitrile. $R_7$ and $R_8$ are preferably different, and one of $R_7$ or $R_8$ is alkyl or alkoxy. Variants of the above-described substituents can be made. In compounds of Formula II where A is a C-C single bond, $R_7$ or $R_8$ is other than a normal alkyl of 2-12 carbon atoms. Nematic substances are described, e.g., in published German Patent Specifications Nos. 1,951,092, 2,014,989 (U.S. Pat. No. 3,773,747), 2,017,727, 2,139,628 (U.S. Ser. No. 277,502, filed Aug. 1, 1972, now U.S. Pat. No. 4,002,670), 2,201,122 and 2,356,085. A large number of such nematic substances is commercially available.

The nematic substances are sometimes modified by the addition of cholesteric compounds in order to achieve memory effects. Such additions of cholesteric compounds generally amount to about 10 parts by weight per hundred of nematic substance.

Liquid crystalline mixtures of the invention, containing at least one compound of Formula (I), can be employed as dielectrics in all kinds of liquid crystal displays. Addition of the biphenyl derivatives leaves the dielectric anisotropy value of the liquid crystalline base substance substantially unchanged. By suitable selection of the base substances, dielectrics with positive or negative dielectric anisotropy can be obtained. Furthermore, the dielectrics of the invention can contain additives which influence conductivity and/or the orienting ability. Typical additives are described, for example, in published German Patent Specifications Nos. 2,209,127 and 2,240,864. Additions of modifying compounds of published German Patent Specification No. 2,321,632 increase the dielectric anisotropy.

If addition of one or more biphenyl derivatives of Formula (I) to a liquid crystalline material gives a mixture with a clear point too low for certain commercial uses, addition of 1-40, preferably 2-20 parts by weight, of one or more biphenyl esters of Formula (III)

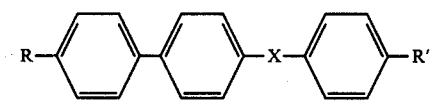
(III)

wherein X is —CO-O— or —O-CO— and R and R' are the same or different and are alkyl or alkoxy of 1-8 carbon atoms, can raise the clear point. These compounds are described in German Patent Application No. P 24 50 088 (U.S. Ser. No. 624,400, filed Oct. 21, 1975, now U.S. Pat. No. 4,065,489, whose disclosure is incorporated by reference).

The liquid crystalline compositions of the invention are used in conventional manner for the construction of liquid crystal displays such as are described in, e.g., U.S. Pat. Nos. 3,322,485; 3,499,112; 3,576,364; 3,592,526; 3,597,044; 3,612,654; 3,625,591; 3,645,604; 3,666,881; 3,690,745; 3,703,329; or 3,918,796.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The following Examples illustrate the preparation of biphenyl derivatives of Formula (I):

EXAMPLE A 160 g. of anhydrous aluminum chloride are added with stirring to 1.9 l. of trichloroethylene at $-15°$ C. To the mixture are added dropwise at this temperature, over 90 minutes, a solution of 154 g. of biphenyl in 400 ml. of trichloroethylene. Thereafter, over 4 hours, a solution of 120 g. of valeric acid chloride in 100 ml. of trichloroethylene is added. The mixture is stirred for 1 hour more and poured on to a mixture of 2.5 kg. of ice and 50 ml. of concentrated hydrochloric acid. The organic phase is separated off and the aqueous phase extracted twice with 300 ml. portions of dichloromethane. The combined organic phases are washed to neutrality with saturated aqueous sodium hydrogen carbonate solution, dried over calcium chloride and evaporated. The residual 4-phenylvalerophenone is recrystallized from methanol, dissolved in 3 l. of ethanol and hydrogenated at 40° C. over 1 g. of palladium on 19 g. of active charcoal as catalyst. After the calculated amount of hydrogen has been adsorbed, the catalyst is filtered off and the solvent evaporated. The 4-n-pentylbiphenyl residue is distilled under reduced pressure. The distillate is dissolved in 200 ml. of trichloroethylene and the solution added dropwise, over 1 hour, to a mixture, cooled to $-15°$ C., of 600 ml. of trichloroethylene and 110 g. of aluminum chloride. Subsequently, at the same temperature, a solution of 63 g. of propionyl chloride in 100 ml. of trichloroethylene is added dropwise over 3 hours. The workup is as described above. 4-n-Pentyl-4'-propionylbiphenyl, recrystallized from methanol, is dissolved in ethanol and hydrogenated at 40° C. over palladium/active charcoal. After hydrogen uptake has ceased, catalyst is filtered off and the filtrate evaporated. Residual 4-n-pentyl-4'-n-propylbiphenyl is recrystallized from methanol, m.p. 45° C.

There are prepared analogously:

4-ethyl-4'-n-pentylbiphenyl, m.p. 35° C.
4-n-heptyl-4'-n-propylbiphenyl, m.p. 48° C.
4-n-heptyl-4'-n-pentylbiphenyl, m.p. 55° C.

EXAMPLE B 480 g. of valeric acid chloride are added dropwise at 20° C., over 90 minutes, to a mixture of 600 ml. of dichloroethane and 256 g. of aluminum chloride. Subsequently, over 4 hours, a solution of 154 g. of biphenyl in 600 ml. of dichloroethane is added dropwise. The mixture is stirred for 1 hour more and poured on to a mixture of 2.5 kg. of ice and 100 ml. of concentrated hydrochloric acid. The organic phase is removed and the aqueous phase extracted twice with 250 ml. portions of dichloromethane and the combined organic phases washed until neutral with sodium hydrogen carbonate solution and dried over calcium chloride. Solvent is distilled off and the residual 4,4'-divaleroylbiphenyl recrystallized from ethanol. The thus-purified product is dissolved in 2.5 l. of tetrahydrofuran and hydrogenated at 40° C. over palladium/active charcoal. After hydrogen take up has ceased, the catalyst is filtered off and the filtrate evaporated. The 4,4'-di-n-pentylbiphenyl residue is recrystallized from ethanol; m.p. 52° C.

There are prepared analogously:

4,4'-di-n-propylbiphenyl, b.p. 122° C./0.2 mm. Hg
4,4'-di-n-butylbiphenyl, m.p. 59° C.
4,4'-di-n-octylbiphenyl, m.p. 65° C.

In the following Examples, the composition of the mixtures is given in parts by weight, M. and K are the melting point and clear point of a substance, respectively. Stated switch times for liquid crystal indicator elements using materials of the invention are given in milliseconds (ms), defined as follows:

$T_O$ = dead time: time from applying voltage to the first recognizable reaction of the indicator element.

$T_E$ = switching on time: time from the first recognizable reaction of the indicator element to reach 90% of the optimum contrast.

$T_A$ = switching off time: time from switching off voltage up to the subsidence of the indicator to less than 30% of optimum contrast.

EXAMPLE 1

The mixture of:
anisic acid 4-n-pentylphenyl ester: 57 parts 4-n-hexylbenzoic acid 4'-n-pentylphenyl ester: 29 parts 4-(4-n-hexyloxybenzoyloxy)benzoic acid (2'-cyano-4'-n-butylphenyl) ester: 14 parts (K 61.3° C.) has, at 20° C., a viscosity of 100 centipoise (cP). In a liquid crystal indicator element based on the dynamic scattering effect, this mixture has the following switch times (layer thickness 20μ, operational voltage 50 V):

$T_O$: 15 ms,
$T_E$: 15 ms,
$T_A$: 320 ms.

By the addition of 4-n-pentyl-4'-n-propylbiphenyl (BI-53), the viscosity is significantly lowered, as shown in the following Table:

Table I:

| Effect of increasing amounts of BI-53 on viscosity and clear point of a liquid crystal ester mixture: | | | |
|---|---|---|---|
| Example No. | parts by weight BI-53 | viscosity [cP] | clear point [° C.] |
| control | 0 | 100 | 61.3 |
| 1a | 6 | 82 | 57 |
| 1b | 10 | 72 | 54 |
| 1c | 20 | 55 | 48 |
| 1d | 30 | 44 | 40.8 |

A liquid crystal indicator element using the mixture of Example No. 1d has the following switch times:

$T_O$: 10 ms,
$T_E$: 10 ms,
$T_A$: 135 ms

EXAMPLE 2

The liquid crystalline base mixture of Example 1 (K. 61.3° C., viscosity 100 cP) is mixed with 10 parts by weight of biphenyl derivatives of Formula (I). The effect on viscosity and on clear point is summarized in Table II:

Table II

| Influence of dialkylbiphenyls on viscosity and clear point of a liquid crystalline ester mixture: | | | |
|---|---|---|---|
| Example No. | dialkylbiphenyl | Viscosity [cP] | clear point [° C.] |
| control | — | 100 | 61.3 |
| 2a | 4-ethyl-4'-n-pentyl-biphenyl | 73.8 | 52 |
| 2b | 4-n-pentyl-4'-n-propyl-biphenyl | 72 | 54 |
| 2c | 4,4'-di-n-pentyl-biphenyl | 71 | 55.3 |
| 2d | 4-n-hexyl-4'-n-pentyl-biphenyl | 88.8 | 45 |
| 2e | 4-n-heptyl-4'-n-pentylbiphenyl | 73.7 | 55.5 |
| 2f | 4-n-heptyl-4'-n-propylbiphenyl | 73.1 | 54.8 |

EXAMPLE 3

The mixture of:
anisic acid 4-n-pentylphenyl ester: 57 parts
4-capronyloxybenzoic acid 4'-n-pentylphenyl ester: 29 parts
4(4-n-hexyloxybenzoyloxyoxy)-benzoic acid (2'-cyano-4'-n-butylphenyl) ester: 14 parts
(K. 59.3°) has at 20° C., a viscosity of 94 cp. Using this mixture, a liquid crystal indicator element described in Example 1 has the following switch times:

$T_O$: 15 ms,
$T_E$: 15 ms,
$T_A$: 320 ms.

By the addition of 30 parts BI-53, there is obtained a liquid crystalline dielectric with a clear point of 40° C. and a viscosity of 39 cP at 20° C. The following switch times are measured:

$T_O$: 10 ms,
$T_E$: 10 ms,
$T_A$: 125 ms.

EXAMPLE 4

The mixture of:
4-n-butyl-4'-methoxyazoxybenzene: 66.5 parts
4-ethyl-4'-methoxy-azoxybenzene: 33.5 parts
(K. 72.5° C.) has, at 20° C., a viscosity of 27.4 cP. By the addition thereto of 10 parts of BI-53, the viscosity is lowered by 13.5% to 23.7 cP, the clear point to 63.3° C.

EXAMPLE 5

The mixture of:
4-n-butyl-4'-methoxyazoxybenzene: 60 parts
4-ethyl-4'-methoxyazoxybenzene: 31 parts
4-(4-n-hexyloxybenzoyloxy)-benzoic acid (2'-cyano-4-n-butylphenyl) ester: 9 parts
(K. 82.2° C.) has, at 20° C., a viscosity of 48.3 cP. By the addition thereto of 10 parts of BI-53, viscosity is lowered by 21.7% to 38.6 cP, the clear point to 71.6° C.

EXAMPLE 6

The mixture of:
4-n-hexylbenzylidene-4'-cyanoaniline: 66.5 parts
4-n-propylbenzylidene-4'-cyanoaniline: 33.5 parts
has, at 20° C., a viscosity of 88 cP. In Table III is summarized the effect of increasing additions of BI-53 or of 4-ethyl-4'-n-propylbiphenyl (BI-23) on the viscosity of the liquid crystalline base mixture:

TABLE III:

| Influence of increasing amounts of BI-53 or of BI-23 on the viscosity of a liquid crystalline azomethine mixture | | | |
|---|---|---|---|
| Example No. | dialkylbiphenyl | added amount [parts] | viscosity [cP] |
| control | — | 0 | 88 |
| 6a | BI-53 | 10 | 73 |
| 6b | " | 20 | 61.5 |
| 6c | " | 30 | 52 |
| 6d | " | 40 | 45 |
| 6e | BI-23 | 10 | 74.5 |
| 6f | " | 20 | 64.8 |
| 6g | " | 30 | 55.7 |
| 6h | " | 40 | 49.2 |

EXAMPLE 7

The mixture of:
4-n-pentyl-4'-cyanobiphenyl 44.7 parts
4-n-heptyl-4'-cyanobiphenyl 26.7 parts
4-n-octyloxy-4'-cyanobiphenyl 17.3 parts
(K. 44.3° C.) has, at 20° C., a viscosity of 32.5 cp. By the addition of 10 parts of BI-53, the viscosity is lowered by 11.5% to 28.4 cP, the clear point to 42.5° C. By a further addition of:

4-n-pentylbiphenyl-4'-carboxylic acid (4-pentylphenyl) ester: 5.8 parts
4-n-pentylbiphenyl-4'-carboxylic acid (4-methoxyphenyl)-ester: 5.5 parts a liquid crystalline dielectric with positive dielectric anisotropy, having, at 20° C., a viscosity of 44.9 cP and a clear point of 56.8° C., is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A nematic or nematic-cholesteric liquid crystalline composition comprising a mixture of (a) at least one nematic or nematic-cholesteric liquid crystalline material and (b) an amount effective to lower the viscosity of (a) of a biphenyl compound of the formula

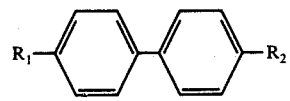

wherein $R_1$ and $R_2$ each are straight-chain alkyl of 2–12 carbon atoms and collectively contain at least 5 carbon atoms.

2. The liquid crystalline composition of claim 1, containing 1–45 weight % of the biphenyl compound.

3. The liquid crystalline composition of claim 1, containing 10–40 weight % of the biphenyl compound.

4. The liquid crystalline composition of claim 1, containing 20–35 weight % of the biphenyl compound.

5. The liquid crystalline composition of claim 1, wherein $R_2$ of the biphenyl compound is straight-chain alkyl of 5–12 carbon atoms.

6. The liquid crystalline composition of claim 1, wherein $R_1$ of the biphenyl compound is straight-chain alkyl of 2–7 carbon atoms and $R_2$ is straight-chain alkyl of 5–10 carbon atoms.

7. The liquid crystalline composition of claim 1, containing an amount effective to raise the clear point thereof, of at least one liquid crystalline biphenyl ester of the formula

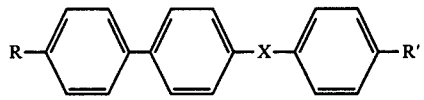

wherein X is —CO-O— or —O-CO— and R and R' are alkyl or alkoxy of 1–8 carbon atoms.

8. The liquid crystalline composition of claim 7, containing 1–40 weight % of the biphenyl ester.

9. The liquid crystalline composition of claim 7, containing 2–20 weight % of the biphenyl ester.

10. The composition of claim 1, wherein the biphenyl compound is 4-n-pentyl-4'-n-propylbiphenyl.

11. The composition of claim 1, wherein the biphenyl compound is 4-ethyl-4'-n-pentylbiphenyl.

12. A method for lowering the viscosity of a nematic or nematic-cholesteric liquid crystalline composition comprising incorporating therein a viscosity-lowering amount of a biphenyl compound of the formula

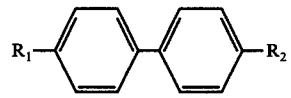

wherein $R_1$ and $R_2$ each are straight-chain alkyl of 2–12 carbon atoms and collectively contain at least 5 carbon atoms.

13. The method of claim 12, wherein the viscosity-lowering amount is 1–45% by weight, of the biphenyl compound.

14. A liquid crystalline display element whose dielectric consists essentially of the composition of claim 1.

* * * * *